United States Patent Office 2,809,533
Patented Oct. 15, 1957

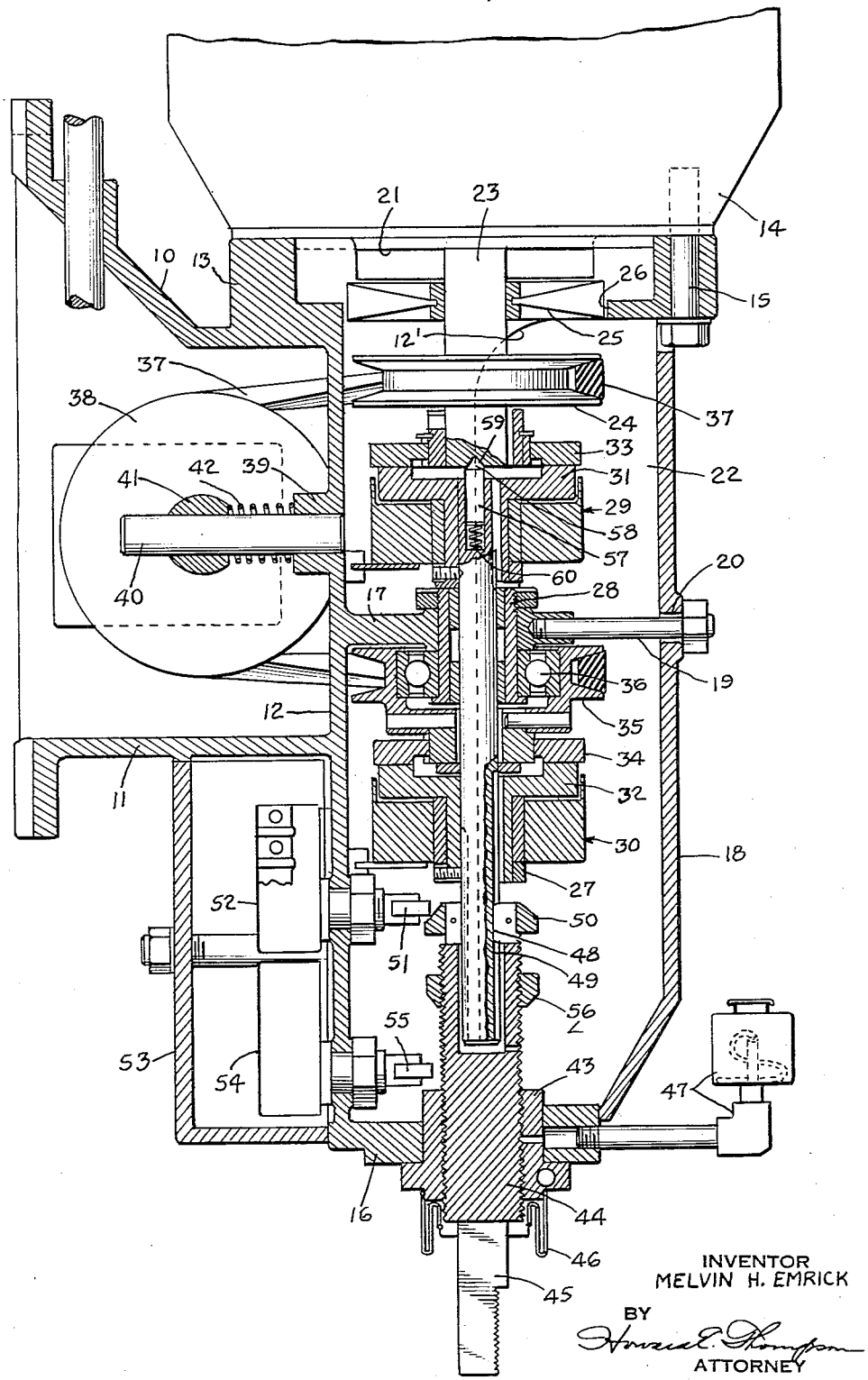

2,809,533

REVERSING DRIVE FOR LEAD SCREW TAPPING UNITS

Melvin H. Emrick, Manhasset, N. Y.

Application October 14, 1953, Serial No. 386,061

2 Claims. (Cl. 74—472)

This invention relates to tapping units of the lead screw type, as defined in a prior application filed by me March 10, 1953, bearing Serial No. 341,394, now Patent No. 2,729,834, dated January 10, 1956. More particularly, the present invention deals with a unit of the character described having a modified form of casing construction together with the inclusion of a fan for circulation of air through the unit.

Still more particularly, the invention deals with a unit of the character described having means for grounding residual forces in rendering the unit more efficient in operation.

The novel features of the invention will be best understood from the following description, when taken together with the accompanying drawing, in which the separate parts are designated by suitable reference characters, and in which the drawing is a longitudinal section through a unit made according to my invention, with part of the structure shown in elevation.

In the drawing, 10 represents the casing or frame of the machine or unit which includes a housing portion 11 partially defined by one elongated wall member 12, the casing including the wall 12 having an enlarged mounting end portion 13 at one end, in connection with which an electric motor 14 can be directly mounted, as for example by bolts or screws, one of which is shown at 15. At the other end of the wall member 12 is a bearing portion 16, and intermediate the ends 13 and 16 is a bearing portion 17. The wall 12 is half round in cross sectional form and joins the end 13 in a rounded portion partially shown at 12' at the left of the drawing. A half round cover plate 18 is mounted on the casing and fits upon the bearing 16, the cover 18 being held in place by a bolt 19 which passes through an opening 20 in the cover 18, as clearly shown. The bolt is secured to the intermediate bearing 17.

The enlarged portion 13 has at opposite sides large openings, one of which is seen at 21, for the circulation of air through the chamber 22, the chamber 22 being formed by the wall 12 and the cover 18. At 23 is shown the shaft of the motor 14 which extends into the chamber 20 and has a driven pulley 24 fixed thereto. Also fixed to the shaft 23 is a fan 25 which operates in an opening 26 in the end 13 of the casing at a position adjacent the openings 21 for circulation of air, as will be apparent.

In alinement with the motor shaft 23 is an elongated driven shaft 27 which is mounted in a suitable elongated bearing 28 in the bearing portion 17 of the casing. At 29 and 30 are shown forward and reverse drive electric clutches generally of the type and kind disclosed in said prior application. The clutch 29 has an element 31 fixed to the shaft 27, whereas a corresponding element 32 is fixed to said shaft, the element 31 operating in conjunction with a disk part 33 of the clutch 29, the latter being fixed to the motor shaft 23, thus providing in energizing of the clutch 29 direct drive of the shaft 27. In the reverse drive, the element 32 operates on a disk 34 of the clutch 30, the latter being fixed to or coupled with a pulley 35 freely rotatable on a ball bearing 36 around the bearing 28 in which the shaft 27 is mounted.

A single belt 37, preferably of the substantially V-shaped cross sectional form as noted, passes around the pulleys 34 and 35 are also around two idler pulleys yieldably supported in the housing 11, one of these pulleys being indicated at 38 in the drawing. The wall 12 has a bearing portion 39 in which is mounted a pin 40. The pulleys 38 include an axis portion 41 which is slidably mounted on the pin 48, and a coil spring 42 engages the axis portion 41 to tensionally support the pulleys 38 in operative position to maintain the belt 37 taut at all times in forward and reverse drives of the unit. It will be understood that in the forward drive of the unit, the pulley 35 rotates idly on the bearing 36, whereas in the reverse drive the clutch 30 directly couples the driven shaft 27 with the pulley 35 in driving the shaft 27 in the reverse direction.

Mounted in the bearing portion 16 of the casing is a split bearing 43 which is internally threaded to receive the lead screw 44 with which a tapping or other tool 45 is coupled in any desired manner. Coupled with the end of the lead screw and with the split bearing 43 is a flexible housing or casing 46 for protection of the screw, particularly when in extended position. Suitable means, as diagrammatically shown at 47, is provided for lubricating the bearing 43. In this connection, it will be apparent that in general uses of the unit the shafts 23 and 27 are disposed vertically in a tapping machine. At one end of the lead screw 44 is a key 48 which operates in an elongated key groove 49 in the shaft 27. Said end of the lead screw also has a switch actuating disk or ring 50 for actuating a switch element 51, which leads to a suitable switch 52 mounted in a casing 53 detachable with respect to the casing 10, another switch 54 being arranged in the casing 53 and includes a switch element 55 spaced with respect to the element 50 and actuated by another disk 56 adjustably supported on the lead screw 44 so as to control operation of the unit from the standpoint of depth of cut or tap in a given workpiece. In other words, when the disk 56 strikes the element 55 the reverse drive will be put into operation, and as the lead screw 44 moves into the casing the disk 50 will then strike the element 51, automatically breaking the circuit to the reverse drive, and putting the forward drive clutch 29 into operation if the unit is worked in an automatic series of successive operations. Otherwise the switch 52 can simply momentarily stop the operation of hte unit and a manually controlled switch can be actuated to put the forward drive clutch 29 into operation.

Another distinctive feature in the construction of my unit resides in the inclusion of a cast iron brush or pin 57, having a conical end 58 which operates in a conical recess 59. In the end of the motor shaft 23, a spring 60 is employed to tensionally maintain the brush or pin 57 in constant engagement with the shaft 23.

It will be apparent that the casing or frame will be recessed at opposite sides to receive the belt of the pulley drive unit.

In lead screw tapping units of the kind under consideration employing the electric clutches, it has been found that magnetic forces are created which tend to hold both sides of the drive together in what might be termed a residual force, which energizes the driven shaft to the point of becoming magnetized. As a result, a magnetic force is built up which acts through the air gap of the clutches and, accordingly, there is a tendency to draw the two parts of the clutch together. This operation will build up a drag which effects the proper functioning of the tapper. This action may be said to create a hopping motion which is repeated many times during the operation of the tapper, and proves to be an annoyance to the operator and also creates wear and tear on equipment. To overcome these objectionable features, I have included a brush at one end of the driven shaft, the brush being composed of any suitable magnetic conducting material, and this brush has a ground seat in the end of the motor shaft so that the magnetic forces are grounded, thus preventing any interference or any objectionable interference in operation of the clutches.

In addition to the foregoing, means are provided to cool the tapping unit which also provents the build up of heat in the drive between the forward and reverse drive clutches. Clutches of the type and kind generate heat and displacement of this heat results in more efficient operation of the unit.

By mounting the reverse drive clutch in the manner disclosed, it will be apparent that when the driven shaft is at rest the clutch element of the reverse drive clutch will remain at rest even though the pulley is in rotation. This feature minimizes wear upon the parts, as will be apparent. It will also be apparent that the present disclosure illustrates one adaptation and use of my grounding principle as applied to forward and reverse drive electric clutches. This grounding principle is applicable to any type and kind of apparatus in which drives of this kind can be practically used.

Having fully described my invention, what I claim as new and desire to secure by Letters Patent is:

1. A lead screw tapping device of the character described, comprising an elongated casing, a lead screw mounted in and movable inwardly and outwardly with respect to one end of the casing, a driven shaft mounted in and arranged longitudinally of the casing in axial alinement with and keyed to said lead screw, a motor having a shaft extending into the other end of the casing in axial alinement with and spaced with respect to one end of said driven shaft, means including forward and reverse drivers on the motor and driven shafts respectively and forward and reverse drive electric clutches in operative engagement with said driven shaft for actuating the driven shaft in the forward and reverse drives of said lead screw, a pair of switch devices arranged in the first named end portion of the casing for controlling operation of said clutches, means on the lead screw operatively engaging the switches in controlling the forward and reverse drives in actuation of said switches, and means providing an electromagnetic ground between the driven shaft and said motor shaft.

2. A lead screw tapping device of the character described, comprising an elongated casing, a lead screw mounted in and movable inwardly and outwardly with respect to one end of the casing, a driven shaft mounted in and arranged longitudinally of the casing in axial alinement with and keyed to said lead screw, a motor having a shaft extending into the other end of the casing in axial alinement with and spaced with respect to one end of said driven shaft, means including forward and reverse drives on the motor and driven shafts respectively and forward and reverse drive electric clutches in operative engagement with said driven shaft for actuating the driven shaft in the forward and reverse drives of said lead screw, a pair of switch devices arranged in the first named end portion of the casing for controlling operation of said clutches, means on the lead screw operatively engaging the switches in controlling the forward and reverse drives in actuation of said switches, means providing an electromagnetic ground between the driven shaft and said motor shaft, a fan fixed to the motor shaft and arranged in the second named end of the casing, and the casing having air circulating passages for circulation of air by said fan in cooling the clutch mechanism of the tapping device.

References Cited in the file of this patent

UNITED STATES PATENTS

| | | |
|---|---|---|
| 731,471 | Le Pontois | June 23, 1903 |
| 1,909,918 | Tanner | May 16, 1933 |
| 2,253,493 | Bakewell | Aug. 26, 1941 |
| 2,354,854 | Doll | Aug. 1, 1944 |